US012399157B2

(12) United States Patent
Koseoglu et al.

(10) Patent No.: US 12,399,157 B2
(45) Date of Patent: *Aug. 26, 2025

(54) OPTIMIZATION OF P-XYLENE RECOVERY BY INTEGRATION OF HPLC INTO AROMATICS RECOVERY COMPLEX

(71) Applicant: SAUDI ARABIAN OIL COMPANY, Dhahran (SA)

(72) Inventors: Omer Refa Koseoglu, Dhahran (SA); Saroj Kumar Panda, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 296 days.

This patent is subject to a terminal disclaimer.

(21) Appl. No.: 17/989,191

(22) Filed: Nov. 17, 2022

(65) Prior Publication Data

US 2023/0417709 A1     Dec. 28, 2023

Related U.S. Application Data

(63) Continuation-in-part of application No. 17/849,249, filed on Jun. 24, 2022, now Pat. No. 12,298,286.

(51) Int. Cl.
*G01N 30/02*     (2006.01)
*B01D 15/08*     (2006.01)

(52) U.S. Cl.
CPC ............ *G01N 30/02* (2013.01); *B01D 15/08* (2013.01); *G01N 2030/027* (2013.01)

(58) Field of Classification Search
CPC .. G01N 30/02; G01N 2030/027; G01N 30/34; G01N 2030/884; G01N 30/88; G01N 2030/062; B01D 15/08; Y02P 20/52
See application file for complete search history.

(56) References Cited

U.S. PATENT DOCUMENTS 6,475,391 B2 * 11/2002 Safir ...................... G01N 30/30
                                                                210/656
10,053,401 B1    8/2018 Beadle et al.
(Continued)

FOREIGN PATENT DOCUMENTS

CN        110161165 A     8/2019
CN        110554107 A    12/2019
(Continued)

OTHER PUBLICATIONS

Abadi, et al., Simultaneous Extraction and Preconcentration of Benzene, Toluene, Ethylbenzene and Xylenes from Aqueous Solutions Using Magneite-Graphene Oxide Composites, Chemical Methodologies, 5(2021), pp. 11-20.
(Continued)

*Primary Examiner* — Peter J MacChiarolo
*Assistant Examiner* — Timothy P Graves
(74) *Attorney, Agent, or Firm* — Bracewell LLP; Constance G. Rhebergen; Eleanor T. Porter

(57) ABSTRACT

Disclosed are methods and systems for quantitation of benzene, toluene, ethyl benzene, o-xylene, m-xylene, and p-xylene in aromatics recovery complexes. High-performance liquid chromatography using a carbon stationary phase and a gradient mobile phase is performed. The carbon stationary phase can be a porous graphitic carbon stationary phase. The mobile phase includes an organic acid in water and an alcohol. The organic acid can include formic acid, and the alcohol can include methanol. The methods and systems achieve a resolution between xylene isomer peaks of greater than 2.0 when sampling industrial process streams in aromatic recovery complexes.

19 Claims, 5 Drawing Sheets

(56) References Cited

U.S. PATENT DOCUMENTS

| | | | |
|---|---|---|---|
| 10,190,987 B2 | 1/2019 | Perez Pellitero et al. | |
| 10,294,172 B2 | 5/2019 | Beadle | |
| 10,392,324 B2 | 8/2019 | Weber et al. | |
| 10,508,066 B2 | 12/2019 | Koseoglu et al. | |
| 10,894,755 B2 | 1/2021 | Xu et al. | |
| 12,181,401 B2 | 12/2024 | Kottapalli et al. | |
| 2005/0106741 A1* | 5/2005 | Dijke .................... | G01N 33/03 436/140 |

FOREIGN PATENT DOCUMENTS

| | | |
|---|---|---|
| CN | 111983090 A | 11/2020 |
| JP | 2002062286 A | 2/2002 |
| KR | 102343702 B1 | 12/2021 |
| TW | 382874 B | 2/2000 |

OTHER PUBLICATIONS

Andrews, et al., The Development of an Inline Raman Spectroscopic Analysis Method as a Quality Control Tool for Hot melt Extruded Ramipril Fixed-dose Combination Products, International Journal of Pharmaceutics, vol. 566, Jul. 20, 2019, 476-487.

Ash, et al., Eluxyl: A New Paraxylene Separation Process, Chevron Chemical Company, SFS-20, Setting the Pace with IFP, Jul. 2000, pp. 271-283, https://www.researchgate.net/publication/245277365_System_Approach_Modeling_Applied_to_the_Eluxyl_Process.

ASTM International, Standard Test Method for Determination of Benzene Toluene Ethylbenzene, p/m-Xylene, o-Xylene, c9 and Heavier Aromatics, and Total Aromatics in Finished Gasoline by Gas Chromatography, SFS-D5580 31469 (2021), pp. 1-12.

Bao, et al., Simultaneous Determination of BTEX in water by High Performance Liquid Chromatography, Guizhou Chemical Industry, 2011, 1pg.

Campos-Candel, et al., Comparative evaluation of liquid chromatography versus gas chromatography-Beta cyclodextrin, Elsevier, Talanta 78 (2009), pp. 1286-1292.

Pereire, Porous Graphitic Carbon as a Stationary Phase in HPLC: Theory and Applications, Journal of Liquid Chromatography & Related Technologies, 31:11-12, pp. 1687-1731, 2008.

Rodriguez, Assessment of Polycrystalline Graphites as Sorbents for Solid Phase Microextraction Coupled to High Performance Liquid Chromatography, Carleton University, Ottawa, Ontario, Canada; May 2000, 206 pgs.

Tan, et al., An HPCL-DAD Method for Rapid and High Resolution Analysis of Concentrated BTEX and Styrene Aqueous Samples, Nanyang Technological University, Singapore (2012), 21 pgs.

Thermo Hypercarb Brochure, Catalog, HPLC and LC/MS, 2019, pp. 101-105, www.thermo.com/columns.

* cited by examiner

OPTIMIZATION OF P-XYLENE RECOVERY BY INTEGRATION OF HPLC INTO AROMATICS RECOVERY COMPLEX

RELATED APPLICATIONS

This application is a continuation-in-part application of U.S. Non-Provisional patent application Ser. No. 17/849,249 filed on Jun. 24, 2022. For purposes of United States patent practice, this application incorporates the contents of the Non-Provisional Application by reference in its entirety.

FIELD

This disclosure relates to a method of separation and quantitation of benzene, toluene, ethyl benzene, and xylenes (BTEX) using high-performance liquid chromatography in an aromatic recovery complex. More specifically, this disclosure relates to the separation and quantitation of aromatic compounds such as ethyl benzene and xylene isomers from BTEX for use in industrial applications.

BACKGROUND

Analysis of benzene, toluene, ethyl benzene, and xylenes (BTEX) has conventionally been performed using gas chromatography techniques or Raman spectroscopy. These conventional techniques, however, were not able to obtain efficient resolution for challenging ethyl benzene and xylene isomers. Other techniques utilizing synthesized stationary phases and liquid chromatography were developed for BTEX separation, but were not commercially available for widespread application in the research and industry fields. The conventional methods are lacking in that they do not obtain efficient resolution of ethyl benzene and xylene isomers, especially for industrial applications.

Crude oil has a large number of differing compounds which are refined and processed for various products including transportation fuels and petrochemicals. Recently, declining petroleum-based fuel usage and growth in petrochemical demand has pushed the petroleum industry to convert a substantial portion of crude oil to petrochemicals such as olefins, aromatics, glycols, and polymers. BTEX compounds are fundamental building blocks for a range of chemicals and polymers. Given the continued and rising importance of BTEX in various industries, a need exists for new methods to separate and quantify ethyl benzene and the individual xylene isomers, especially para-xylene, in BTEX samples from industrial settings, such as aromatics recovery complexes.

SUMMARY

Methods and systems for high-performance liquid chromatography for the separation of BTEX with a resolution between xylene isomer peaks of greater than 2.0 are disclosed herein. A stationary carbon phase and UV and fluorescence detectors are used. A commercially available porous graphitic carbon phase can be used. A mobile phase composition of organic acid in water and alcohol can be used. The composition of the mobile phase is altered over time. The resolution between two adjacent xylene isomer peaks (o-xylene and p-xylene) using this method is greater than 2.0. The quantification of xylene isomers was achieved by preparing calibration standards of different concentrations of 10 ppm, 50 ppm, 100 ppm, and 500 ppm for each isomer and measuring the response from the fluorescence detector (or peak height, or alternately peak area). Linear calibration plots were generated which can be used to quantify the amount of each isomer in the sample.

Disclosed is a method for the determination of concentrations of aromatic hydrocarbon components in industrial samples from an aromatics recovery complex. The method includes the steps of gathering a sample from a process stream in the aromatics recovery complex, and analyzing the sample. The step of analyzing the sample includes the steps of injecting the sample into a high-performance liquid chromatography column. The high-performance liquid chromatography column includes a carbon stationary phase. The sample includes aromatic hydrocarbon components. The aromatic hydrocarbon components are selected from the group including benzene, toluene, ethyl benzene, xylene isomers, and combinations of the same. The xylene isomers are selected from the group including o-xylene, p-xylene, m-xylene, and combinations of the same. The method also includes the step of introducing a mobile phase into the carbon stationary phase. The mobile phase includes an organic acid in water and an alcohol. The method further includes the step of increasing the concentration of the alcohol in the mobile phase and decreasing the concentration of the organic acid in water in the mobile phase so that the mobile phase reaches a concentration of 100% of the alcohol and 0% of the organic acid in water, so that a gradient elution is performed. Then the method includes the step of decreasing the concentration of the alcohol in the mobile phase and increasing the concentration of the organic acid in water in the mobile phase. The method also includes the step of quantitating, based on the gradient elution, a concentration of the xylene isomers in the prepared sample.

In some embodiments, the method produces a resolution of greater than 2.0 of p-xylene from o-xylene and ethyl benzene. In some embodiments, the method includes the steps of preparing a sample for analysis by diluting the sample with an alcohol, generating a first dilution; filtering the first dilution, generating a filtered first dilution; and diluting the filtered first dilution with alcohol. The concentration of organic acid is 0.1 vol % in water. The organic acid is formic acid. The alcohol is methanol.

In some embodiments, the steps of increasing the concentration of the alcohol in the mobile phase and decreasing the concentration of the organic acid in water in the mobile phase, then decreasing the concentration of the alcohol in the mobile phase and increasing the concentration of the organic acid in water in the mobile phase, is carried out in accordance with the following time intervals and concentrations:

| Time (min) | Organic Acid in Water (vol % of the mobile phase) | Alcohol (vol % of the mobile phase) |
|---|---|---|
| 0.00 | 50 | 50 |
| 40.0 | 20 | 80 |
| 50.0 | 0 | 100 |
| 55.0 | 0 | 100 |
| 55.1 | 50 | 50 |
| 65.0 | 50 | 50. |

In some embodiments, the carbon stationary phase is a porous graphitic carbon stationary phase. The process stream contains a hydrocarbon component and is selected from the group including reformate, fuel oil, hydrodearylated products, transalkylated products, catalytic cracking products, fractionation products, thermal cracking products, steam cracking products, coal liquefaction products, gasification products, and combinations of the same.

In some embodiments, the aromatic recovery complex includes a unit generating the process stream, and the unit is selected from the group including reforming stabilizer column, reformate splitter, clay tower, hydrogenation unit, xylenes rerun column, heavy aromatics column, p-xylene separation unit, xylene isomerization unit, hydrodearylation unit, transalkylation unit, transalkylation unit stabilizer, benzene extraction unit, benzene column, toluene column, and combinations of the same. In some embodiments, the steps of gathering the sample from the process stream in the aromatics recovery complex, analyzing the sample, and quantitating, based on the gradient elution, a concentration of the xylene isomers in the sample is repeated at a regular intervals, and further wherein the concentration of the xylene isomers is utilized to optimize the aromatics recovery complex.

Also disclosed is a system for the determination of concentrations of aromatic hydrocarbon components in industrial samples from an aromatic recovery complex. The system includes a process unit and a high-performance liquid chromatography instrument fluidly connected to the process unit. The high-performance liquid chromatography instrument includes a carbon stationary phase, a mobile phase including an organic acid in water and an alcohol, a UV detector, and a fluorescence detector. The high-performance liquid chromatography instrument is configured to perform a gradient elution so that the mobile phase reaches a concentration of 100% of the alcohol and 0% of the organic acid in water. The high-performance liquid chromatography instrument is also configured to analyze a sample gathered from a process stream in the process unit, the sample including aromatic hydrocarbon components. The aromatic hydrocarbon components are selected from the group including benzene, toluene, ethyl benzene, xylene isomers, and combinations of the same. The xylene isomers are selected from the group including o-xylene, p-xylene, m-xylene, and combinations of the same. The system is configured so that a sample chromatogram can be generated.

In some embodiments, the UV detector operates at 254 nm. The fluorescence detector operates with an excitation at 200 nm and an emission at 300 nm. The carbon stationary phase is a column having a length of equal to or greater than 250 mm. In some embodiments, the carbon stationary phase is a porous graphitic carbon stationary phase. The porous graphitic carbon stationary phase is a commercially available. The system is configured to operate at 30° C. The process unit is selected from the group including reforming stabilizer column, reformate splitter, clay tower, hydrogenation unit, xylenes rerun column, heavy aromatics column, p-xylene separation unit, xylene isomerization unit, hydrodearylation unit, transalkylation unit, transalkylation unit stabilizer, benzene extraction unit, benzene column, toluene column, and combinations of the same.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

DETAILED DESCRIPTION

Figure 1:
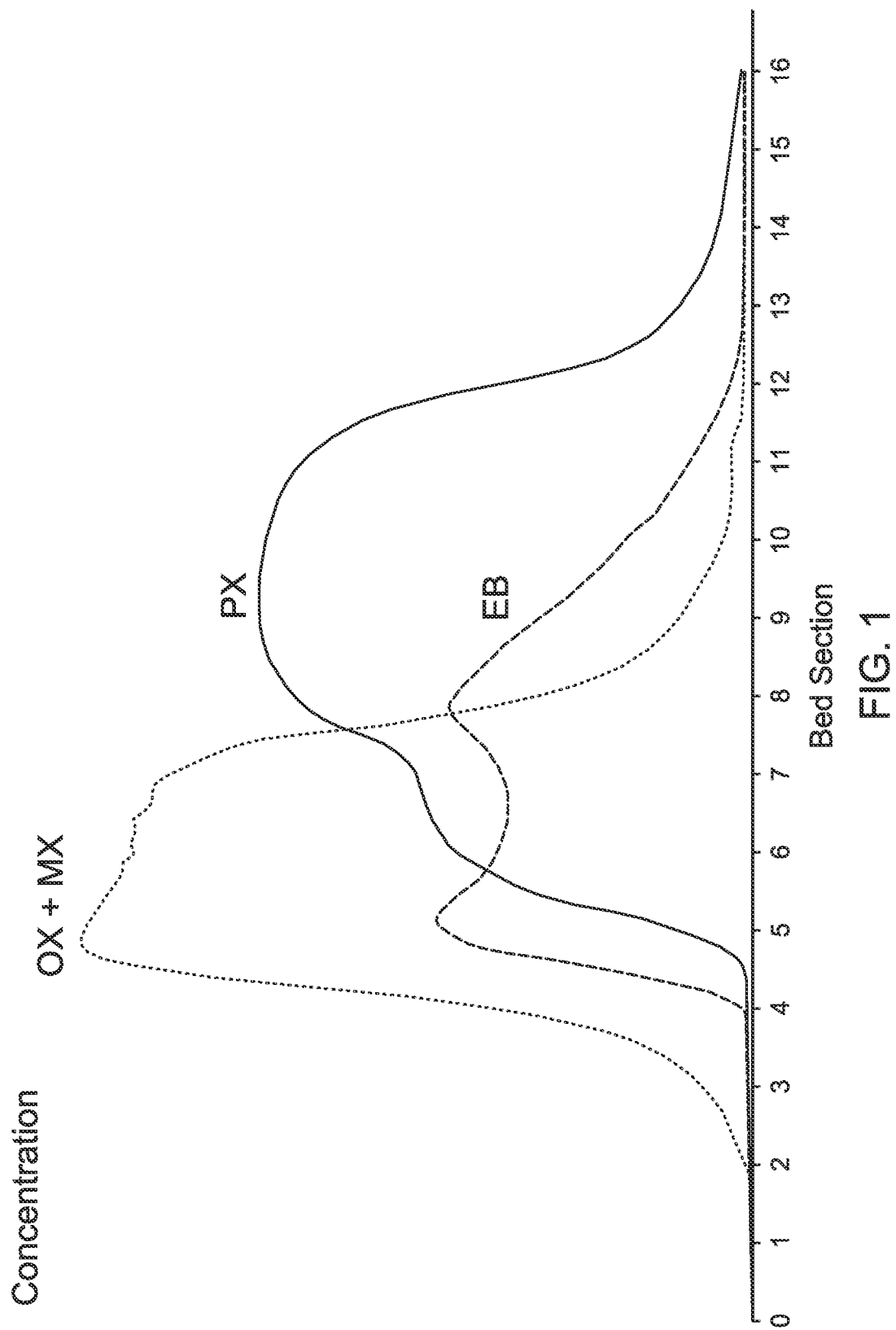
FIG. 1 is a concentration profile of Raman spectroscopy analysis for BTEX representative of prior art.

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

The terms "comprising," "including," "having," and the like, as used with respect to embodiments of the present disclosure, are synonymous and are each intended to have an open, non-limiting meaning that does not exclude additional elements or steps. In this disclosure and the appended claims, the terms "about" and "approximately" can include a deviation of ±5% of the given value unless the deviation changes the nature or effect of the value such that it is not operable to achieve its intended purpose. The terms "optional" or "optionally" mean that an element can be used for some embodiments, but can be omitted in other embodiments. The singular forms "a," "an," and "the" include plural referents, unless the context clearly dictates otherwise.

Methods of high-performance liquid chromatography for the analysis of aromatic compounds such as BTEX in samples, specifically industrial samples from aromatic recovery complexes, are disclosed. A resolution between ethyl benzene and the individual xylene isomer peaks of greater than 2.0 can be obtained. The method utilizes a carbon stationary phase, as well as UV and fluorescence detectors. A varying mobile phase composition of organic acid in water and methanol is used. The samples are industrial samples and can be minimally processed before analysis. In some embodiments, the samples are gathered directly from the process units, and sample is piped directly to the chromatography system from the process streams (in-line analysis). In some embodiments, the samples are gathered from the process streams and analyzed separately (off-line analysis). The samples contain other components that conventional methods can have difficulty in analyzing or reporting. Conventional methods can be easily incapacitated by contaminants that can cause insufficient separation of components, which can result in unclear results and an inability to identify or quantify components.

The samples that can be analyzed utilizing these methods include industrial process samples containing BTEX, including those BTEX samples that are derived from reformate, coal liquefaction products, gasification products, hydrodearylated products, cracking products, or other petrochemical products. Other industrial samples that can be analyzed utilizing the methods disclosed herein include feed or product from aromatic aromatics processing, aromatics separation, hydrodearylation, transalkylation, fluid catalytic cracking, thermal cracking, steam cracking, hydroprocessing, reforming, petrochemical processing, and combinations of the same. Specifically of interest are samples derived from aromatics complexes. Industrial samples can contain compounds that boil in the gasoline range of 36° C. to 220° C. Aromatics complexes separate naphtha or pyrolysis gasoline into BTEX, which are base petrochemical intermediates. In many aromatic complexes, the mixed xylenes generated are further processed to target production of p-xylene. p-Xylene is of particular interest as it can be further processed to produce terephthalic acid, an important component in producing polyesters. To increase BTEX production, transalkylation and toluene disproportionation process units are utilized. When p-xylene is recovered from mixed xylenes by a selective adsorption process unit, the feed to the selective adsorption process unit is processed through catalytic reactions and fractionation to eliminate olefins and alkenyl aromatics, including styrene, from the feed. In preferred embodiments, the xylene concentration of the sample being tested ranges from 0.001 wt % to 0.05 wt % after the sample preparation step of dilution of the sample with alcohol.

The industrial processes can include aromatic recovery complexes. Aromatics recovery complexes process reformate in order to recover higher value products, such as xylenes and benzenes. The feed to aromatics recovery complexes is generally limited to $C_6$ to $C_{11}$ compounds. Aromatics recovery complexes also separate and improve lower value products from reformate, such as toluene, into the higher value products. Various product streams can be processed or separated in the aromatics recovery complex. Mixed xylenes can be processed to isolate and produce additional p-xylene. C8 fractions can be processed to produce p-xylene, which is separated from o-xylene, m-xylene, and ethylbenzene using selective adsorption or crystallization. The p-xylene-lean stream having a concentration lower than the p-xylene-rich stream can be recycled in the isomerization unit and the p-xylene recovery unit. o-Xylene and m-xylene can be isomerized to produce an equalized mixture of xylenes. Ethylbenzene can be isomerized into xylenes or dealkylated to benzene and ethane. Naphtha and pyrolysis gasoline can be separated into benzene, toluene, and mixed xylenes. Toluene, $C_9$, and $C_{10}$ aromatics can be processed through a toluene, $C_9$, $C_{10}$ transalkylation and toluene disproportionation (TA/TDP) process.

p-Xylene can be recovered from mixed xylenes in the aromatics recovery complex by selective adsorption. $C_8$ streams introduced to the selective adsorption process are processed with a clay or acidic catalyst to eliminate olefinic alkenyl aromatics, such as styrene. The alkenyl aromatics react with another monoaromatic molecule through an alkylation reaction to produce non-condensed bridged di-tri-tetra aromatic molecules, such as $C_{16}$ molecules, which are later removed through fractionation. Efficiently and effectively operating an aromatics complex is greatly enhanced when feedstock, intermediate, and final product streams can be analyzed quickly and accurately for target compounds.

Advantageously, the methods and systems disclosed herein allow for the quantitation and separation of aromatic components, specifically benzene, toluene, ethyl benzene, o-xylene, m-xylene, and p-xylene. The methods also allow for the quantification of separate xylene isomers and ethyl benzene. The resolution between the xylene isomers is more than approximately 2, which exceeds prior art resolutions and allows for better separation and quantitation of the various xylene isomers. Additionally, the resolution between the xylene isomers and ethyl benzene is also more than approximately 2, which exceeds prior art resolutions and allows for better separation and quantitation of the compounds. Beneficially, the stationary phase graphitic column that can be utilized in the method is commercially available. Additionally, the method can be used on industrial processes samples and still provide significant resolution. Industrial process samples can have substantially higher BTEX concentrations that what can be analyzed in conventional systems. Conventional processes for the quantitation and separation of aromatic components using gas or liquid chromatography generally cannot handle the high concentrations in industrial samples due to the inability to separate the components at high concentrations. Additionally, industrial samples are far more complex and contain unknown compounds in comparison to the standard mixtures; however, the methods disclosed herein are advantageously able to analyze industrial samples. In the presently disclosed methods, the samples from industrial processes do not need to undergo complex processing or separation before analysis; instead, the samples are only diluted and simply filtered prior to analysis, which is standard for chromatography analysis. The preparation of the samples (either industrial or standard calibration samples) occurs in the absence of any other separation, processing, or additional filtration.

Conventional methods and systems do not provide the above advantages. Referring to FIG. 1, a concentration profile is shown from a conventional Raman spectroscopy analysis measuring BTEX concentration. FIG. 1 is a reproduction of FIG. 4 from the publication Ash et al., "Eluxyl: A New Paraxylene Separation Process," Revue de L'institut Francais du Petrol, 49 (1994), 541-549. The conventional method uses fiber optics to transmit the spectrum concentration profiles in the column. As seen in FIG. 1, even when a xylene adsorptive separation column is utilized, the method fails to provide clear separation between the components. The o-xylene and m-xylene peaks are combined, and the curves for o-xylene and m-xylene, p-xylene, and ethyl benzene overlap across multiple bed sections.

Figure 2:
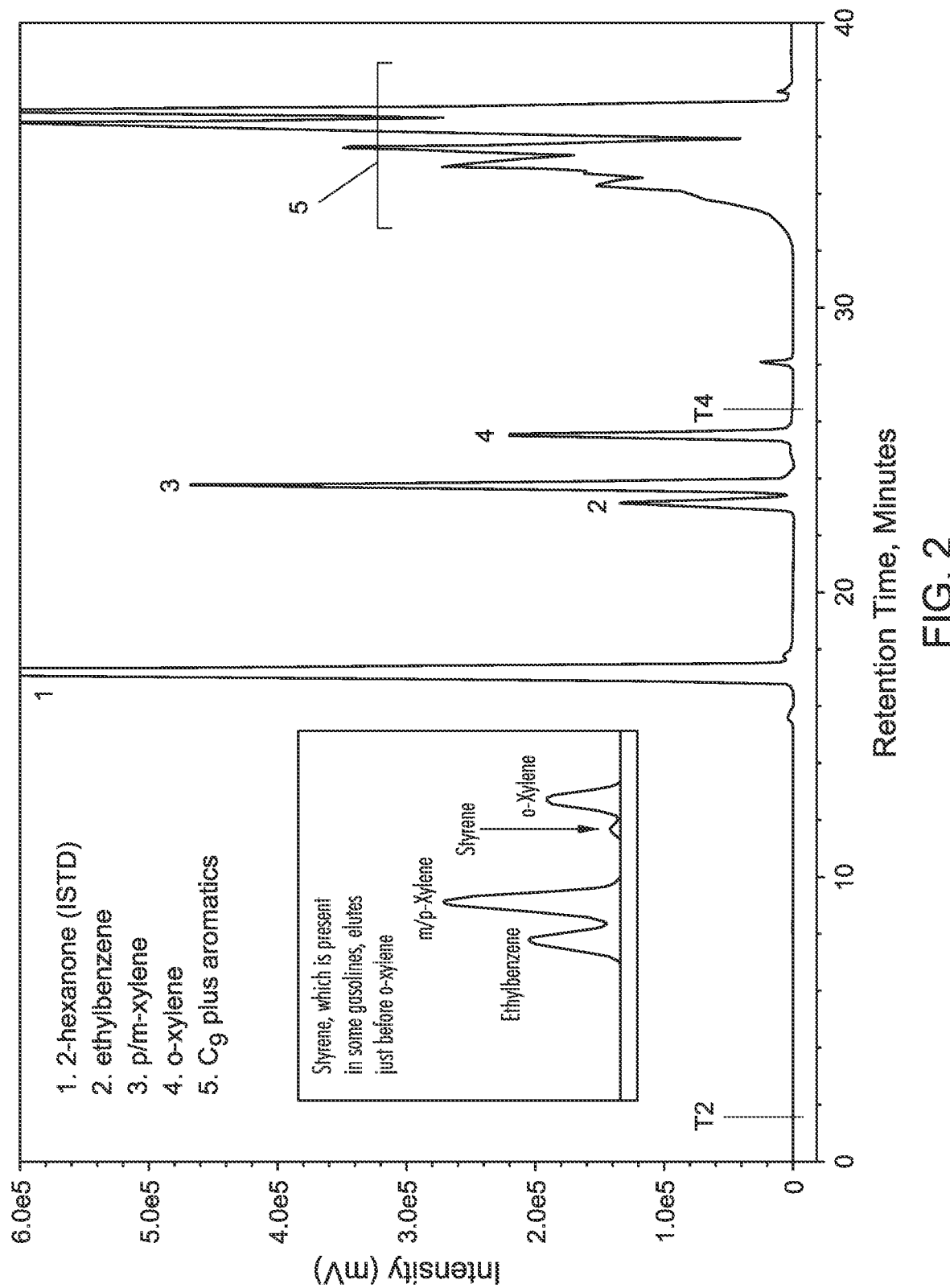
FIG. 2 is a chromatogram of ASTM D5580-21 analysis for BTEX representative of prior art.

Referring to FIG. 2, a chromatograph shows the results of an ASTM D5580-21 standard test for the determination of BTEX components in gasoline, with identification of the various component peaks. FIG. 2 is a reproduction of FIG. 5 from the ASTM D5580-21 testing standards, "Standard Test Method for Determination of Benzene, Toluene, Ethylbenzene, p/m-Xylene, o-Xylene, $C_9$ and Heavier Aromatics, and Total Aromatics in Finished Gasoline by Gas Chromatography," ASTM International, 2021. Again, the conventional method of ASTM D5580-21 does not separate p-xylenes and m-xylenes.

The methods disclosed herein resolve these issues by utilizing a high-performance liquid chromatographic method to detect aromatic compounds, such as BTEX, including xylene isomers such as m-xylene, o-xylene, and p-xylene. The high-performance liquid chromatographic method utilizes a carbon stationary phase. In some embodiments, the carbon stationary phase is equal to or greater than 250 mm in length. Generally, longer columns allow for greater resolution due to improved separation. In preferred embodiments, the carbon stationary phase is a porous graphitic carbon phase column. A commercially available porous graphitic carbon phase column can be used for the methods disclosed herein, and can be purchased readily, such as a Hypercarb® column from Thermo Scientific Limited Company. The porous graphitic carbon phase column can be 250 mm (length)×4.6 mm (internal diameter), 5 μm particle size. The carbon column can have a range of hydrophobicity, a pH acceptance range of 0 to 14, a pore size from 0 to 250 μm, a carbon load range percent of 1 to 100, and a particle size of 3 μm, 5 μm, and 7 μm. The carbon column can have a specific surface area of 120 m²/g, a 250 Å median pore diameter, and a 75% porosity. In some embodiments, the packing material of the carbon column can withstand a pressure of at least 400 bar. Detection can be performed using a UV detector operating at 254 nm and a fluorescence detector with excitation at 200 nm, and emission at 300 nm. Advantageously, the method is performed at 30° C., at approximately ambient temperatures.

Samples for analysis are prepared by measuring 100 µL (which can be approximately equal to 95 mg) and performing a first dilution of the sample in 900 µL of methanol. The first diluted mixture is filtered through a 0.2 µm syringe filter producing a filtered mixture, and then a second dilution is performed on the filtered mixture of 1 part sample to 10 parts methanol prior to injection into the high-performance liquid chromatograph system. The sample is otherwise not additionally processed before analysis. Advantageously, the lack of significant or complex pre-processing of the industrial sample reduces time and labor to obtain the results without sacrificing accuracy and component separation.

The injection volume of the analyzed composition can be up to 10 µL. The separation is performed utilizing gradient elution. The mobile phase flow rate for the method can be in the range of 0.1 mL/min to 1.0 mL/min, alternately 0.25 mL/min to 1.0 mL/min, alternately 0.5 mL/min to 1.0 mL/min, alternately 0.75 mL/min to 1.0 mL/min, and alternately less than or equal to 1.0 mL/min. In some preferred embodiments, the mobile phase flow rate for the method is 1.0 mL/min. The total run time is 65 minutes.

An organic acid in water is utilized with an alcohol for the mobile phase. In some embodiments, the organic acid is acetic acid. In some embodiments, the organic acid is trifluoro acetic acid. In some embodiments, the organic acid is formic acid. In some embodiments, the organic acid is an aqueous composition of 0.1 vol % organic acid in water. In preferred embodiments, the organic acid is an aqueous composition of 0.1 vol % formic acid in water. Alcohols with Hildebrand solubility factors of equal to or greater than 20 MPa$^{1/2}$ can be utilized. In preferred embodiments, the alcohol is methanol. Other alcohols with similar solubility factors to methanol can be used. In some embodiments, the alcohol is n-butyl alcohol. In preferred embodiments for xylene isomer separation, 0.1 vol % formic acid in water is the organic acid in water and methanol is the alcohol.

In the method, as time passes and the mobile phase is injected into the column, the concentration of the mobile phase is changed by increasing and decreasing the two components: organic acid in water and alcohol. The concentration of the alcohol in the mobile phase is increased over time, and the concentration of the organic acid in water in the mobile phase is decreased over time, such that the mobile phase reaches a concentration of 100% of the alcohol and 0% of the organic acid in water. In some embodiments, the concentration of the mobile phase is held at 100% alcohol for a period of time. Not to be bound by theory, but the use of high concentration of alcohol at 100% of the mobile phase appears to allow for the other compounds, and potential contaminants, from the industrial samples to be cleaned from the column in order to enhance the BTEX identification. The increase in the alcohol concentration removes more hydrophobic compounds present in the samples from the column. These hydrophobic compounds are more likely to be present in industrial process samples, and are problematic for quantification and separation of BTEX compounds. Proceeding the increase in the alcohol to 100% of the mobile phase concentration, the concentration of the organic acid in water in the mobile phase is increased over time, and the concentration of the alcohol in the mobile phase is decreased over time. Table 1 shows the gradient elution and mobile phase component concentration in volume percentage of the mobile phase. The proper combination of alcohol and acid, and the varying concentrations of the mobile phase components, assist in allowing for xylene isomer peak separation.

TABLE 1

Mobile Phase Concentrations

| Time (min) | Organic Acid in Water (vol % of the mobile phase) | Alcohol (vol % of the mobile phase) |
|---|---|---|
| 0.00 | 50 | 50 |
| 40.0 | 20 | 80 |
| 50.0 | 0 | 100 |
| 55.0 | 0 | 100 |
| 55.1 | 50 | 50 |
| 65.0 | 50 | 50 |

The final composition of 50% of the organic acid in water and 50% of alcohol is held for the time period between 55.1 and 65.0 minutes to allow the system to get equilibrated for the next separation. The system can generate a chromatogram for the composition being analyzed.

Figure 3:
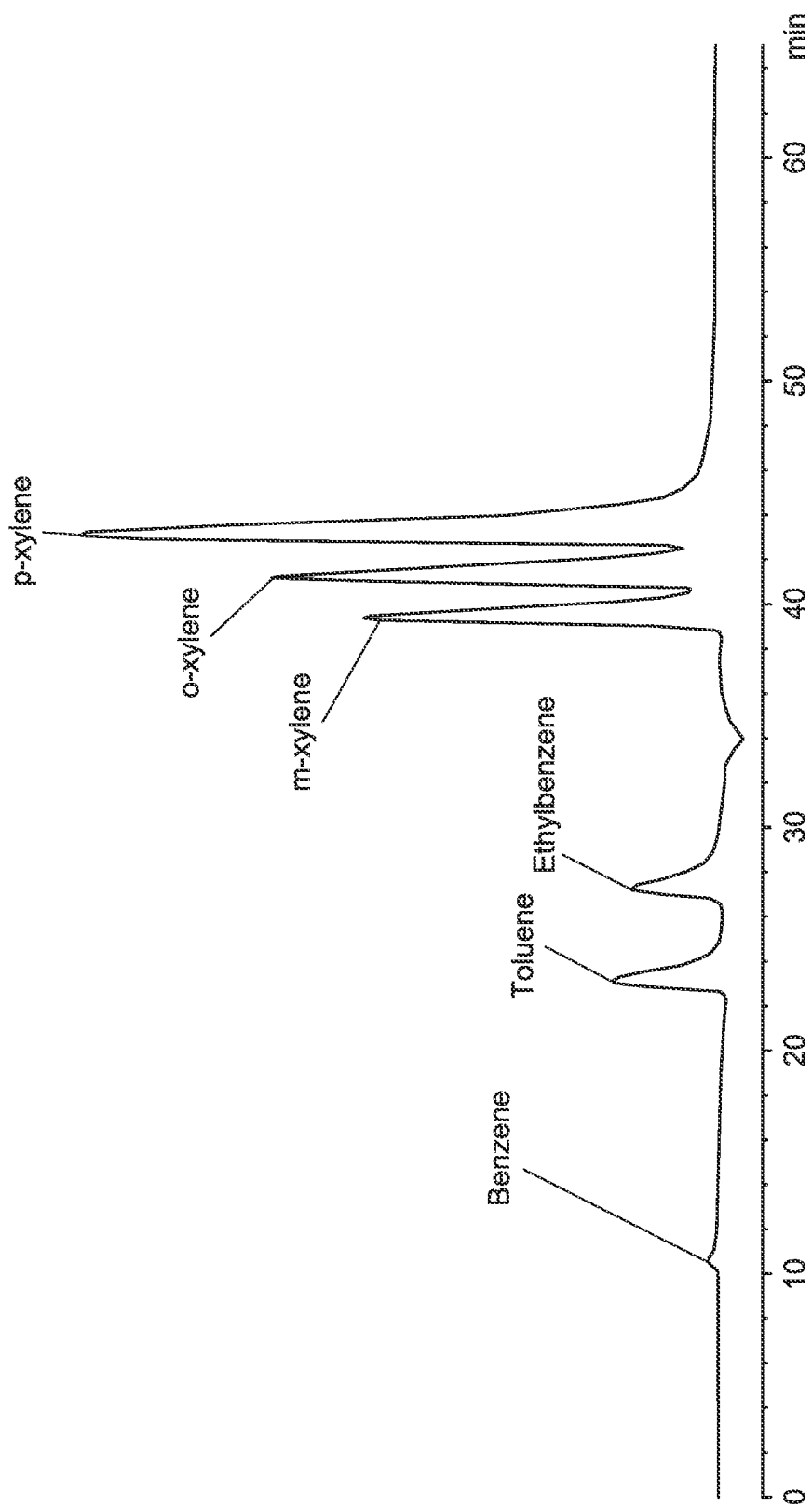
FIG. 3 is a chromatogram of a standard mixture from the high-performance liquid chromatography methods, according to an embodiment.

Referring to FIG. 3, a chromatograph depicting the results of the analysis of a standard mixture containing benzene, toluene, ethyl benzene, o-xylene, m-xylene, and p-xylene in accordance with the methods disclosed herein is shown. The standard mixture was prepared in methanol according to the sample preparation method outlined above. The mobile phase included 0.1% formic acid in water as the organic acid in water and methanol as the alcohol.

Figure 4:
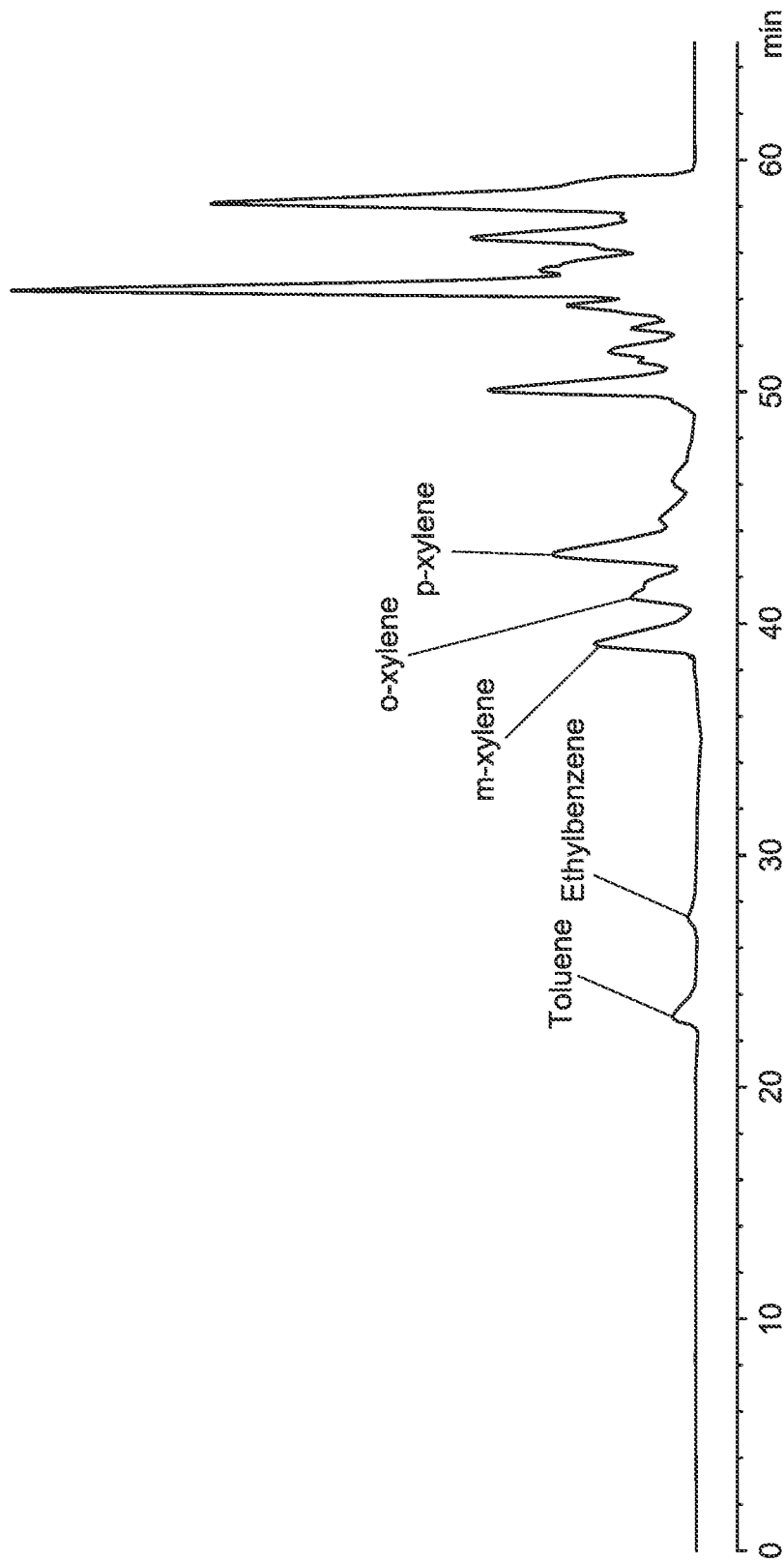
FIG. 4 is a chromatogram of a refinery sample from the high-performance liquid chromatography methods, according to an embodiment.

Referring to FIG. 4, a chromatograph depicting the results of the analysis of a hydrodearylated aromatic bottoms stream containing BTEX compounds in accordance with the methods disclosed herein is shown. The hydrodearylated aromatic bottoms stream can be generated from hydrodearylation processes such as those described in U.S. Pat. No. 10,053,401, which is incorporated herein by reference in its entirety. The mobile phase included 0.1 vol % formic acid in water as the organic acid in water and methanol as the alcohol. As shown in FIGS. 3 and 4, the resolution between two adjacent xylene isomer peaks, including between o-xylene, and p-xylene, using the methods disclosed herein is greater than 2.0. The resolution (Rs) is determined according to the following equation (EQ. 1):

$$Rs = 2*(t_{R2}-t_{R1})/(w_{b1}+w_{b2}) \qquad \text{EQ. 1}$$

where Rs is the resolution between compound 1 and compound 2, where compound 1 elutes before compound 2; $t_{R1}$ is the retention time for compound 1; $t_{R2}$ is the retention time for compound 2; $w_{b1}$ is the peak width for compound 1; and $w_{b2}$ is the peak width for compound 2. Resolutions of 2 or greater are needed for clear separation of two peaks.

Quantitation of xylene isomers can be performed by preparing calibration standards of varying concentrations of isomers and measuring the response (peak height or peak area) from the fluorescence detector. The concentrations of the calibration standards include 10 ppmw, 50 ppmw, 100 ppmw, and 500 ppmw. Linear calibration plots can then be constructed for each isomer. Linear calibration plots are generated by charting the concentration in ppm of the standard calibration HPLC runs against the peak height or the peak area for the concentration values for each compound. The linear calibration plots can be then used to quantitate the amount of each isomer in the prepared sample. Once the linear calibration plots are generated, the concentration of the prepared sample (which was diluted during the preparation steps) is interpolated from the linear calibration plots using the peak height or peak area of the prepared sample. The mass of the compound is then calculated from the prepared sample using the interpolated concentration, and then the mass is multiplied by the dilution factor to obtain the sample mass of the original sample, pre-dilution. The sample mass can then be converted to weight percentage utilizing the total sample weight.

Figure 5:
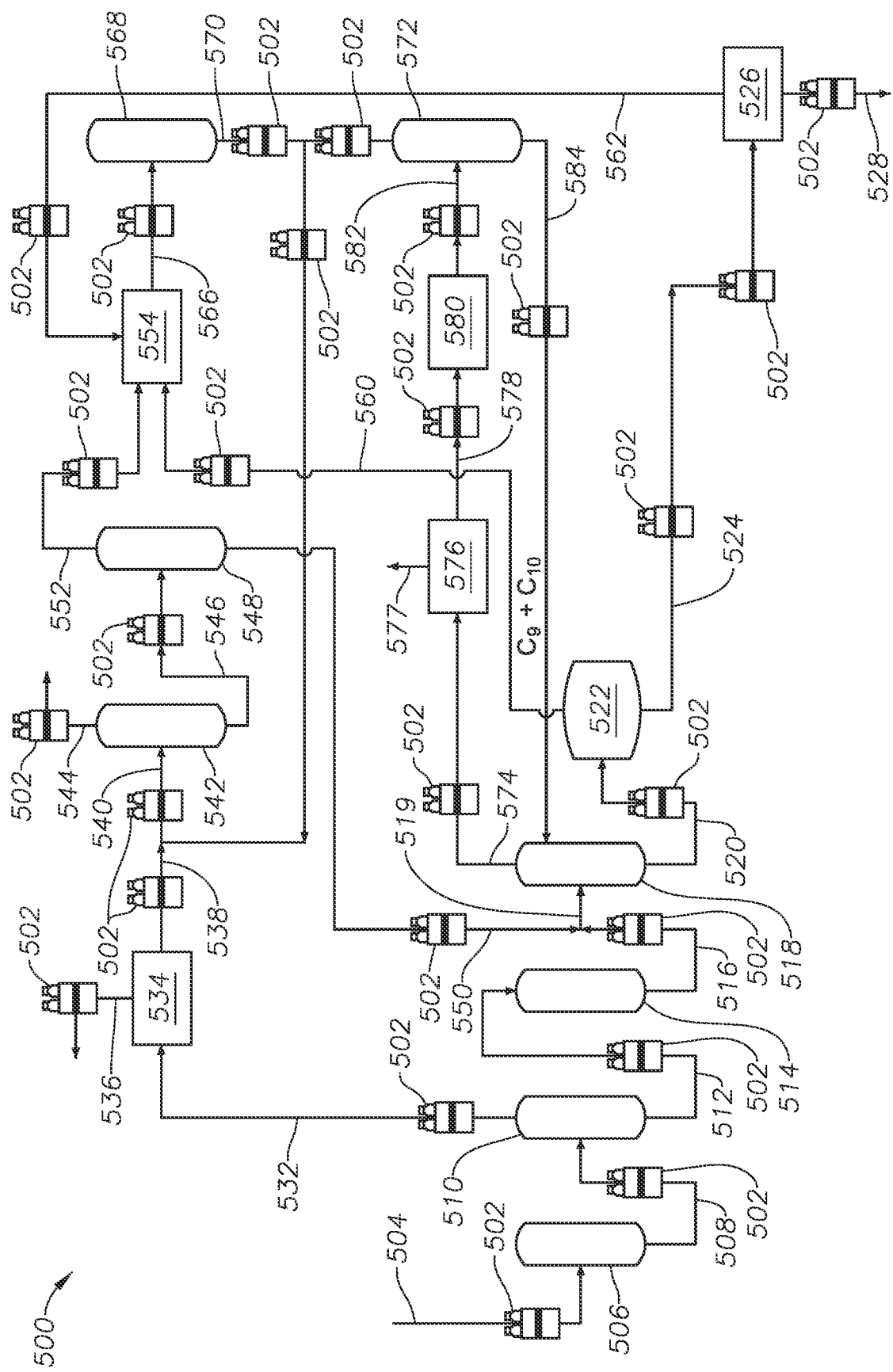
FIG. 5 is a diagram of an aromatics recovery complex, according to an embodiment.

Referring to FIG. 5, aromatics recovery complex 500 is shown, featuring multiple HPLC units 502. HPLC unit 502 is an HPLC instrument system featured an HPLC as described herein and utilizing the methods described herein. Each stream is analyzed by a separate HPLC unit. Thus, a plurality of HPLC units are shown in aromatics recovery complex 500. Each HPLC unit 502 operates independently, but functions similarly to one another. The temperature and pressure of the samples collected and sent to the HPLC unit is adjusted by cooling mechanisms and pressure reducers in order to render the sample acceptable for the HPLC instrument and process. In other embodiments, one HPLC unit is connected to multiple process streams such that one HPLC unit can analyze different samples from multiple, but separate, process streams. Unstabilized reformate stream 504 contains unprocessed reformate with lighter components and is analyzed by HPLC unit 502. Unstabilized reformate stream 504 is introduced into reforming stabilizer column 506. Reforming stabilizer column 506 separates lighter components from the feed streams and can be operated at a temperature of about 150° C. and at about 15 barg. Reforming stabilizer column product stream 508 contains reformate products and exits reforming stabilizer column 506, and is analyzed by another HPLC unit 502. Reforming stabilizer column product stream 508 is introduced into reformate splitter 510. Reformate splitter 510 can operate in a temperature range of about 120 to about 170° C. and a pressure range of about 0.5 to about 2 barg. Reformate splitter 510 generates C8+ reformate stream. C8+ reformate stream 512 contains mainly $C_{8+}$ compounds including ethylbenzene and xylenes, as well as $C_9$ and $C_{10+}$ compounds, and is analyzed by HPLC unit 502 before being introduced into clay treater 514. Clay treater 514 removes impurities and can be operated in a temperature range of about 170 to about 200° C. and a pressure of about 14 to about 17 barg. Clay treater 514 generates clay treater product stream 516, which is analyzed by HPLC unit 502 and combined with toluene column bottoms stream 550 to generate combined xylenes rerun column feed stream 519. Clay treater product stream 516 substantially contains $C_8$ components, such as ethylbenzene and xylenes, and $C_9$ aromatics.

Combined xylenes rerun column feed stream 519 is introduced to xylenes rerun column 518. Xylenes rerun column 518 can be operated in a temperature range of about 210 to about 240° C., and at a pressure of about 10 barg. Xylenes rerun column product stream 520 exits xylenes rerun column 518. Xylenes rerun column product stream 520 contains primarily xylenes with lower quantities of ethylbenzene and insignificant amounts of toluene. In some embodiments, xylenes rerun column product stream 520 can contain equal to or greater than 20 wt % o-xylene, equal to or greater than 20 wt % p-xylene, equal to or greater than 40 wt % m-xylene, and equal to or less than 10 wt % ethylbenzene. Xylenes rerun column product stream 520 is analyzed by HPLC unit 502 and then introduced into heavy aromatics column 522. Heavy aromatics column 522 separates heavier aromatic components for further processing and can be operated at a temperature of about 300° C. and a pressure of about 20 barg. Heavy aromatics column 522 generates C9/C10 stream 560, which contains primarily $C_9$ and $C_{10}$ aromatics. Heavy aromatics column 522 also generates C11+ heavy aromatics stream 524, which contains $C_{11+}$ heavy aromatics. C11+ heavy aromatics stream 524 is analyzed by one or more HPLC units 502 and introduced to hydrodearylation unit 526. Hydrodearylation unit 526 can be operated in a temperature range of about 350 to about 400° C., a pressure range of about 15 to about 50 barg, with an LHSV in the range of about 1 to about 2, and with a cracking catalyst such as a Ni/Mo on an alumina, silica-alumina, or zeolite structure. Hydrodearylation unit 526 generates fuel oil 528, which is analyzed by HPLC unit 502. Hydrodearylation unit 526 also generates hydrodearylation recycle stream 562, which is analyzed by HPLC unit 502.

Reformate splitter 510 also generates C7 stream 532. C7 stream 532 contains primarily $C_7$ compounds, and is analyzed by HPLC 502. C7 stream 532 is introduced to extraction unit 534. Extraction unit 534 can be operated at a temperature of about 175° C. and a pressure of about 11 barg. Extraction unit 534 generates non-aromatic raffinate stream 536, which can contain p-xylene, o-xylene, and $C_9$ aromatics, or other compounds that are not aromatic in nature. Non-aromatic raffinate stream 536 is analyzed by HPLC unit 502. Extraction unit 534 also generates extraction unit product stream 538, which is analyzed by HPLC unit 502, and contains benzene in large quantities. Extraction unit product stream 538 is combined with transalkylation stabilizer product stream 570 to generate benzene column feed stream 540. Benzene column feed stream 540 is analyzed by HPLC unit 502. Benzene column feed stream 540 is introduced to benzene column 542, which separates benzene from benzene column feed stream 540. Benzene column 542 can be operated in a temperature range of about 90 to about 110° C. and at a pressure in the range of about 0.7 to about 1.0 barg.

Benzene column 542 generates benzene product stream 544, which contains primarily benzene. Benzene product stream 544 is analyzed by HPLC unit 502. Benzene column 542 also generates benzene column bottoms stream 546, which contains toluene, small quantities of ethylbenzene, xylene isomers, and $C_{9+}$ aromatics. In some embodiments, benzene column bottoms stream 546 contains about 60 wt % toluene, less than about 1 wt % ethylbenzene, about 7 wt % p-xylene, about 14 wt % m-xylene, about 7 wt % o-xylene, and about 12 wt % $C_{9+}$ aromatics. Benzene column bottoms stream 546 is analyzed by HPLC unit 502. Benzene column bottoms stream 546 is introduced to toluene column 548. Toluene column 548 separates toluene from benzene column bottoms stream 546, and can operate in a temperature range of about 90 to about 120° C. and a pressure range of about 0.7 to about 1.0 barg. Toluene column 548 generates toluene column bottoms stream 550, which contains primarily xylene isomers and $C_{9+}$ aromatics with small quantities of toluene and ethylbenzene. Toluene column bottoms stream 550 is analyzed by HPLC unit 502. Toluene column 548 also generates toluene column overhead stream 552, which contains substantially toluene. Toluene column overhead stream 552 is analyzed by HPLC unit 502, and introduced into transalkylation unit 554.

Transalkylation unit 554 also accepts C9/C10 stream 560, which is analyzed by HPLC unit 502. Transalkylation unit 554 also accepts hydrodearylation recycle stream 562. Transalkylation unit 554 generally produces transalkylated products through a transalkylation reaction. Transalkylation unit 554 generates transalkylation unit product stream 566, which is analyzed by HPLC unit 502. Transalkylation unit product stream 566 contains light products such as $C_1$ through $C_4$ in amounts equal to or less than about 1 wt %; $C_5$ products in larger quantities such as about 20 wt %; benzene in larger quantities such as about 16 wt %; toluene in larger quantities such as about 36 wt %; xylene isomers in larger quantities such as p-xylene at about 8 wt %, m-xylene at about 17 wt %, and o-xylene at about 8 wt %; and $C_{9+}$ isomers in larger quantities such as about 14 wt %. Transalkylation unit product stream 566 is introduced to transalkylation stabilizer 568. Transalkylation stabilizer 568 generates transalkylation stabilizer product stream 570. Transalkylation stabilizer product stream 570 is analyzed by HPLC unit 502. Transalkylation stabilizer product stream 570 is split such that a portion is combined with extraction unit product stream 538 and a portion is introduced into deheptanizer unit 572, which recycles $C_6$ and $C_7$ compounds back to benzene column 542. Deheptanizer unit 572 produces C8 stream 584, which contains $C_8$ compounds. C8 stream 584 is analyzed by HPLC unit 502 and is introduced to xylenes rerun column 518.

Xylenes rerun column 518 also generates xylenes rerun column overhead stream 574. Xylenes rerun column overhead stream 574 contains $C_8$ compounds and is analyzed by HPLC unit 502 and introduced into p-xylene unit 576, which separates p-xylene from the feed streams. p-Xylene unit 576 generates p-xylene stream 577, which contains primarily p-xylene. p-Xylene unit 576 also generates p-xylene depleted stream 578, which contains primarily o-xylene and m-xylene. p-Xylene stream 577 and p-xylene depleted stream 578 are both analyzed by HPLC unit 502. p-Xylene depleted stream 578 is introduced to isomerization unit 580. Isomerization unit 580 utilizes an isomerization process to target the production of certain BTEX isomers, typically p-xylene, and can produce benzene and toluene. Generally, o-xylene and m-xylene are recycled to extinction in order to generate p-xylene in isomerization unit 580. Isomerization unit 580 generates isomerization product stream 582. Isomerization product stream 582 is analyzed by HPLC unit 502 and introduced to unit 572.

The HPLC unit can be fluidly connected to the process streams via a pipe. In some embodiments, HPLC unit 502 is on a select number of streams, but not all streams, within aromatics recovery complex 500. In some embodiments, there is only one HPLC unit 502 on a specific stream of interest within aromatics recovery complex 500. In some embodiments, one HPLC unit is connected to multiple process unit streams, such that the singular HPLC can process samples separately from different process unit streams. The HPLC unit can be utilized to analyze samples from other process units including olefin hydrogenation units, adsorption units, crystallization units, xylene isomerization units, benzene extraction units, and other petrochemical processing units.

In some embodiments, the samples are analyzed with HPLC according to the methods disclosed herein, and are also analyzed through gas chromatography or Raman spectroscopy. Samples can be gathered from the process streams and analyzed by the HPLC system at a regular time interval. In some embodiments, the time interval is one hour, and the sampling rate is one sample per hour.

The results of the analysis and the quantified concentration of the various xylene isomers or BTEX can be utilized to optimize the operation of the process units such that the process streams fall within a specified compound concentration range. In some embodiments, the concentration values are sent to the process control units. The process control units can then alter individual process unit operation conditions to optimize the production of certain compounds and obtain a specified compound concentration range.

What is claimed is:

1. A method for the determination of concentrations of aromatic hydrocarbon components in industrial samples from an aromatics recovery complex, the method comprising the steps of:
    gathering a sample from a process stream in the aromatics recovery complex;
    analyzing the sample, comprising the steps of:
        injecting the sample into a high-performance liquid chromatography column, wherein the high-performance liquid chromatography column comprises a carbon stationary phase, further wherein the sample comprises the aromatic hydrocarbon components, wherein the aromatic hydrocarbon components are selected from the group consisting of: benzene, toluene, ethyl benzene, xylene isomers, and combinations of the same, wherein the xylene isomers are selected from the group consisting of: o-xylene, p-xylene, m-xylene, and combinations of the same;
        introducing a mobile phase into the carbon stationary phase, wherein the mobile phase comprises an organic acid in water and an alcohol;
        increasing the concentration of the alcohol in the mobile phase and decreasing the concentration of the organic acid in water in the mobile phase such that the mobile phase reaches a concentration of 100% of the alcohol and 0% of the organic acid in water, such that a gradient elution is performed; then
        decreasing the concentration of the alcohol in the mobile phase and increasing the concentration of the organic acid in water in the mobile phase; and
    quantitating, based on the gradient elution, a concentration of the xylene isomers in the sample.

2. The method of claim 1, wherein the method produces a resolution of greater than 2.0 of p-xylene from o-xylene and ethyl benzene.

3. The method of claim 1, further comprising the steps of:
    preparing the sample for analysis prior to injecting the sample into a high-performance liquid chromatography column by:
        diluting the sample with an alcohol, generating a first dilution;
        filtering the first dilution, generating a filtered first dilution; and
        diluting the filtered first dilution with alcohol.

4. The method of claim 1, wherein the alcohol is methanol.

5. The method of claim 1, wherein the concentration of organic acid is 0.1 vol % in water.

6. The method of claim 5, wherein the organic acid is formic acid.

7. The method of claim 5, wherein the steps of increasing the concentration of the alcohol in the mobile phase and decreasing the concentration of the organic acid in water in the mobile phase, then decreasing the concentration of the alcohol in the mobile phase and increasing the concentration of the organic acid in water in the mobile phase, is carried out in accordance with the following time intervals and concentrations:

| Time (min) | 0.1 vol % Organic Acid in Water (vol % of the mobile phase) | Alcohol (vol % of the mobile phase) |
|---|---|---|
| 0.00 | 50 | 50 |
| 40.0 | 20 | 80 |
| 50.0 | 0 | 100 |
| 55.0 | 0 | 100 |
| 55.1 | 50 | 50 |
| 65.0 | 50 | 50. |

8. The method of claim 1, wherein the carbon stationary phase is a porous graphitic carbon stationary phase.

9. The method of claim 1, where the process stream comprises a hydrocarbon component, the process stream selected from the group consisting of: reformate, fuel oil, hydrodearylated products, transalkylated products, catalytic cracking products, fractionation products, thermal cracking products, steam cracking products, coal liquefaction products, gasification products, and combinations of the same.

10. The method of claim 9, wherein the aromatics recovery complex comprises a unit generating the process stream, the unit selected from the group consisting of: reforming stabilizer column, reformate splitter, clay tower, hydrogenation unit, xylenes rerun column, heavy aromatics column, p-xylene separation unit, xylene isomerization unit, hydrodearylation unit, transalkylation unit, transalkylation unit stabilizer, benzene extraction unit, benzene column, toluene column, and combinations of the same.

11. The method of claim 1, wherein the steps of gathering the sample from the process stream in the aromatics recovery complex, analyzing the sample, and quantitating, based on the gradient elution, a concentration of the xylene isomers in the sample is repeated at a regular intervals, and further wherein the concentration of the xylene isomers is utilized to optimize the aromatics recovery complex.

12. A system for the determination of concentrations of aromatic hydrocarbon components in industrial samples from an aromatics recovery complex, the system comprising:
a process unit;
a high-performance liquid chromatography instrument, the high-performance liquid chromatography instrument fluidly connected to the process unit, the high-performance liquid chromatography instrument comprising:
a carbon stationary phase;
a mobile phase comprising an organic acid in water and an alcohol;
a UV detector; and
a fluorescence detector;
wherein the high-performance liquid chromatography instrument is configured to perform a gradient elution such that the mobile phase reaches a concentration of 100% of the alcohol and 0% of the organic acid in water;
further wherein the high-performance liquid chromatography instrument is configured to analyze a sample gathered from a process stream in the process unit, the sample comprising aromatic hydrocarbon components, wherein the aromatic hydrocarbon components are selected from the group consisting of: benzene, toluene, ethyl benzene, xylene isomers, and combinations of the same, wherein the xylene isomers are selected from the group consisting of: o-xylene, p-xylene, m-xylene, and combinations of the same, such that a sample chromatogram can be generated.

13. The system of claim 12, wherein the UV detector operates at 254 nm.

14. The system of claim 12, wherein the fluorescence detector operates with an excitation at 200 nm and an emission at 300 nm.

15. The system of claim 12, wherein the carbon stationary phase is a column has a length of equal to or greater than 250 mm.

16. The system of claim 12, wherein the carbon stationary phase is a porous graphitic carbon stationary phase.

17. The system of claim 16, wherein the porous graphitic carbon stationary phase is commercially available.

18. The system of claim 12, wherein the system is configured to operate at 30° C.

19. The system of claim 12, wherein the process unit is selected from the group consisting of: reforming stabilizer column, reformate splitter, clay tower, hydrogenation unit, xylenes rerun column, heavy aromatics column, p-xylene separation unit, xylene isomerization unit, hydrodearylation unit, transalkylation unit, transalkylation unit stabilizer, benzene extraction unit, benzene column, toluene column, and combinations of the same.

* * * * *